Dec. 1, 1925.

E. O. BACHMAN

SEAT SUPPORT FOR TRACTORS

Filed March 10, 1923

1,563,824

2 Sheets-Sheet 1

WITNESSES

INVENTOR
E. O. Bachman,
BY
ATTORNEYS

Dec. 1, 1925.  
E. O. BACHMAN  
1,563,824  
SEAT SUPPORT FOR TRACTORS  
Filed March 10, 1923   2 Sheets-Sheet 2
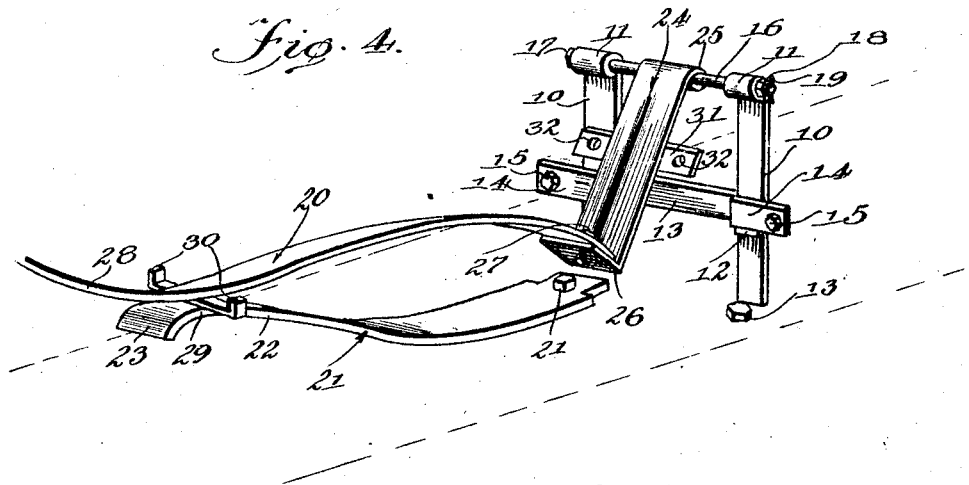
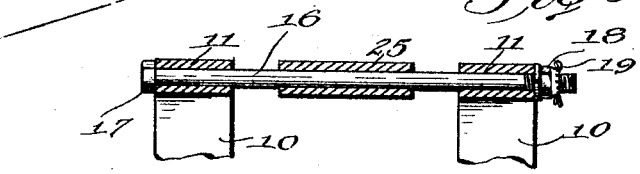
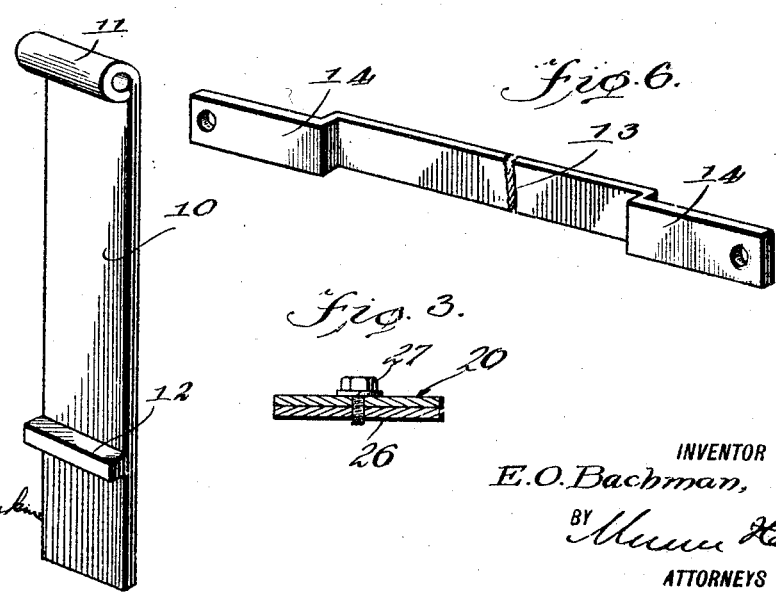
WITNESSES
INVENTOR  
E. O. Bachman,  
BY  
ATTORNEYS Patented Dec. 1, 1925.

1,563,824

UNITED STATES PATENT OFFICE.

ERNEST OLIVER BACHMAN, OF SANTA ANA, CALIFORNIA.

SEAT SUPPORT FOR TRACTORS.

Application filed March 10, 1923. Serial No. 624,252.

*To all whom it may concern:*

Be it known that I, ERNEST OLIVER BACHMAN, a citizen of the United States, and a resident of Santa Ana, in the county of Orange and State of California, have invented certain new and useful Improvements in Seat Supports for Tractors, of which the following is a specification.

This invention relates to improvements in seat supports for tractors.

The object of the present invention is to provide a seat support for tractors which will efficiently absorb shocks to which the same may be subjected and provide an extremely comfortable seat for the driver or manipulator of the tractor with which the same may be associated.

It is also within the scope of the objects of the invention that the seat supporting means be durable and inexpensive to manufacture.

The present seat supporting means is particularly adapted for use on the "Fordson tractor", and a further object of the invention is that the supporting means be adapted to be placed upon a tractor of this character in a short interval of time and without dispensing with the seat supporting spring usually employed upon a tractor of this type.

Other objects and objects relating to details of construction, combination and arrangement of parts will hereinafter appear in the detailed description to follow.

The invention is illustrated by way of example in the accompanying drawings, in which—

Figure 1:
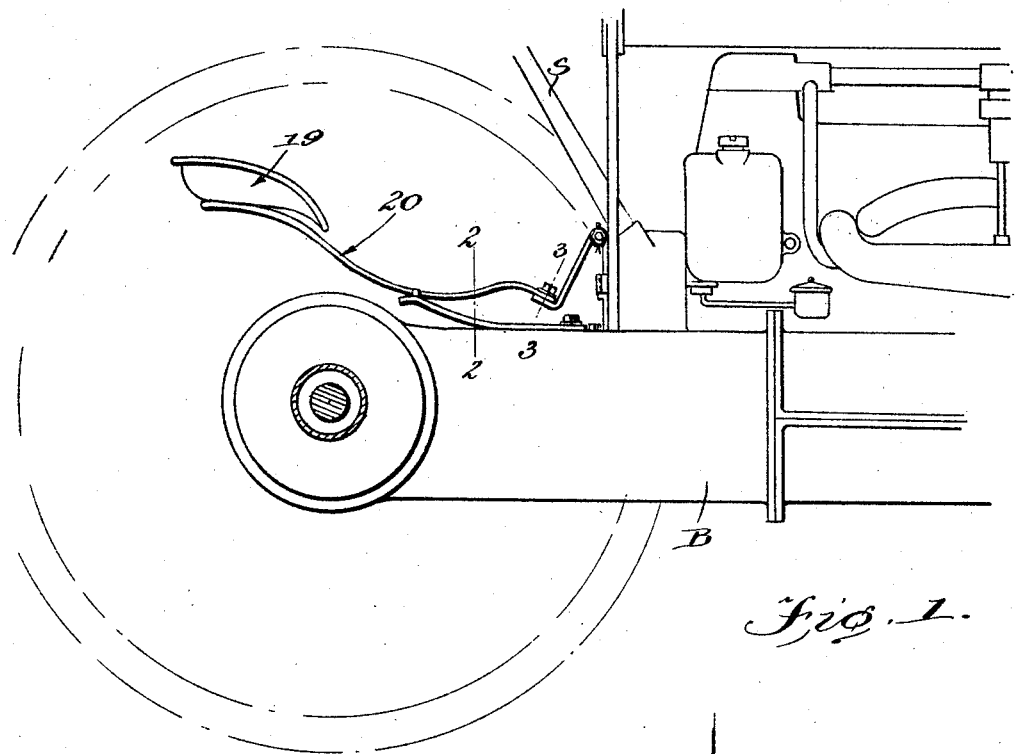
Figure 2:
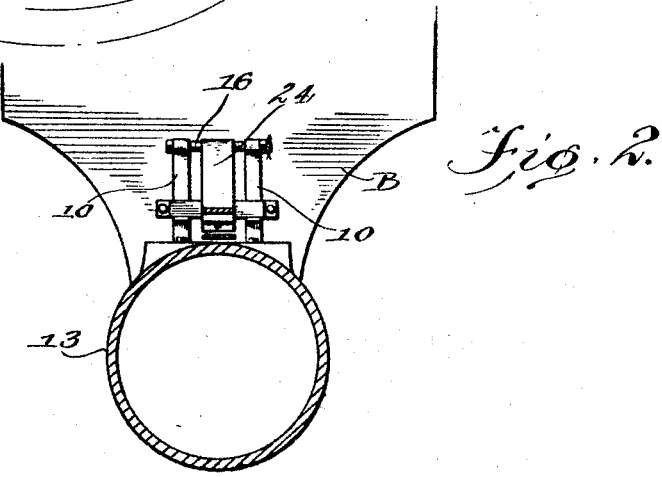

Figure 1 is a view in side elevation of the rear end portion of a tractor and showing the present invention applied, Figure 2 is a vertical sectional view taken substantially on the lines 2—2 of Figure 1, Figure 3 is a sectional view taken substantially on the lines 3—3 of Figure 1, Figure 4 is a detailed perspective view illustrating the seat supporting means of the present invention, Figure 5 is a detailed view illustrating the manner in which the spring leaf for the seat is pivotally supported at its one end, Figures 6 and 7 are detailed perspective views of elements employed in the seat support construction.

Referring to the drawings more particularly, in Figure 1, B indicates generally the body of a tractor and S the steering column which houses the usual steering rod carrying at its upper end the usual steering wheel, not shown. As is well known in this type of tractor immediately below the lower end of steering column S there is mounted a tool box, and it is contemplated in the present invention, to remove this tool box and utilize the bolts or studs extending from the body of the tractor for securing the seat supporting means in position. Also suitable other means which will later be described are provided for carrying the tool box removed.

In carrying out the present invention, there is provided a pair of spring straps 10, each spring strap terminating at its one end in an eye 11 and having formed upon its one side a lug or projection 12. There is also provided a strap 13 which is formed adjacent each end with an offset portion 14, said offset portion being equal in length to the width of the spring straps 10. The spring straps 10 are positioned vertically, as shown, and their lower ends adapted to engage upon the inner side of a flange bolt 13' usually employed upon a tractor of this type. The strap 13 is positioned as shown, and a machine bolt 15 is extended through each end thereof for securing the same in position. The machine bolts may be the same as used for securing the tool box before mentioned to the tractor. As is obvious by this arrangement the spring straps 10 are rigidly held in the position shown.

Between the upper ends of the spring straps, there is yieldingly supported a rod 16, said rod extending through eyes 11 of said spring straps and carrying a head upon its one end as at 17 and a removable nut 18 upon its other end, said nut 18 being held against accidental removal from the rod by a cotter pin 19.

In this type of tractor a seat 19 is supported upon a leaf spring 20 and this leaf spring is in turn secured by a bolt 21 at its forward end to the body of the tractor. In this instance, the bolt 21 is removed to release the seat 19 and spring 20 from the tractor. A second leaf spring 21 is provided which is formed with an upwardly extending portion 22 at its rear end. This end of the spring member is of less thickness than the forward end portion thereof. Also the rear end of this spring member is preferably curved downwardly as at 23. The forward end of the spring member 21 is provided with a suitable opening adapted to receive the bolt 21, and the bolt 21 is utilized for securing the spring member to the body of the tractor.

An elongated plate member 24 is provided which is formed with an eye 25 at its upper end, and through said eye there is extended the rod 16 whereby to secure the forward end of the member 24. The resilient strips 10, together with the rod 16, provide a flexible connection for the upper end of member 24. The lower end of the member 24 is provided with a portion 26 extending at an angle thereto, and the forward end of the leaf spring 20 is secured to this portion by the means of the bolt 27. As is shown, the leaf spring 20 is curved upwardly as at 28 and substantially at this point the spring rests upon the rear end of the leaf spring 21. In order to hold the leaf spring 20 against extreme side movement in either direction, there is provided a guide member 29 which is in the form of a U-shaped clip, the leg portions 30 of which are adapted to engage the edges of the leaf spring 20, and thereby limit the side movement thereof. The member 29 is preferably brazed or otherwise suitably secured to the leaf spring 20.

To the bottom face of the member 24 there is secured a cross member 31 which extends from the side edges of the member 24 as shown. Each end of the member 31 is provided with an opening 32. The tool box heretofore referred to may be positioned upon the member 24 and secured to the cross member 31. By positioning the tool box in this manner the same is within convenient reach of the driver of the tractor, that is, assuming the driver would be seated in the seat 19.

The spring 21 serves as a supplemental spring absorbing shocks to which the occupant of the seat 19 may be subjected. The spring strap members 10 serve also as supplemental springs aiding in carrying the weight in seat 19 and yieldingly allowing said seat and spring 20 to move from side to side absorbing side movements and shocks to which the occupant of seat 19 may be subjected. This spring may move upwardly and downwardly with the member 24 serving as a pivot therefor. Also spring 20 may move from side to side, by the spring strap members 10 yieldingly supporting 16 on which 24 is pivotally secured. Thus these spring strap members 10 serve to overcome side thrusts to which the seat supporting means may be subjected. The member 29 serves to retain the spring 20 against extreme side movement only, as before stated.

It is believed from the description heretofore given of the present invention taken in connection with the drawings, that it is entirely clear, the manner in which the seat supporting means may be mounted upon a tractor.

It is also apparent that the usual seat employed may be easily and quickly removed and then properly connected to be supported by the means of the present invention.

While I have shown my invention as being applied to a particular form of tractor, I wish it to be understood that the same might be applied with equal advantages to other forms of tractors and also to other forms of devices which may be stationary or movable without departing from the present form of invention, as indicated by the appended claims.

I claim:—

1. In combination, a pair of yieldable standards, a rod supported between the upper and free ends of said standards, a link member pivotally connected at its one end to said rod, a leaf spring having its one end rigidly secured to the remaining end of the link member and carrying a seat upon its other end, and a second leaf spring having its one end anchored and its other end slidably engaging beneath the first named spring for yieldably supporting the same.

2. In combination, a pair of yieldable standards, a rod supported between the upper and free ends of said standards, a link member pivotally connected at its one end to said rod, a leaf spring having its one end rigidly secured to the remaining end of the link member and carrying a seat upon its other end, a second leaf spring having its one end anchored and its other end slidably engaging beneath the first named spring for yieldably supporting the same, and a U-shaped clip carried by the second leaf spring adapted to limit lateral movement of the first named leaf spring.

ERNEST OLIVER BACHMAN.